(12) United States Patent
Jefferson

(10) Patent No.: US 7,942,465 B1
(45) Date of Patent: May 17, 2011

(54) INTENSIVE SOLAR PHOTOVOLTAIC MOBILE POWER MODULE SYSTEM

(76) Inventor: Sylvan Jefferson, Surrey (CA)

( * ) Notice: Subject to any disclaimer, the term of this patent is extended or adjusted under 35 U.S.C. 154(b) by 0 days.

(21) Appl. No.: 12/581,350

(22) Filed: Oct. 19, 2009

(51) Int. Cl.
*B60P 3/335* (2006.01)

(52) U.S. Cl. .................................................. 296/168

(58) Field of Classification Search .......... 296/156–176
See application file for complete search history.

(56) References Cited

U.S. PATENT DOCUMENTS

| 3,815,948 A * | 6/1974 | Alford ........................ 296/180.4 |
| 2008/0163918 A1* | 7/2008 | Li .................................. 136/244 |
| 2010/0071749 A1* | 3/2010 | Brescia ......................... 136/244 |

\* cited by examiner

*Primary Examiner* — Dennis H Pedder

(57) ABSTRACT

This invention involves an intensive system including a solar photovoltaic mobile power module. The system is set in a shell serving as a whole recreation vehicle (RV), which contains some auto body parts such as a chassis, wheels, a traction frame etc. The front-end face of the RV entirely installed with BIPV solar power glass curtain wall plates is 66-degree angle with the chassis. In addition, the front and rear parts of the RV are equipped with solar panels. The middle part of the RV has windows, while guardrails and a maintenance-ladder are also available in the rear. In the RV, there are facilities such as a bookshelf, a double bed, a bathtub, a toilet seat, a refrigerator, sofas, a desk, a vegetables pool, a console, a wardrobe, a door and a platform.

3 Claims, 3 Drawing Sheets

INTENSIVE SOLAR PHOTOVOLTAIC MOBILE POWER MODULE SYSTEM

TECHNICAL FIELDS

The invention involves the fields of solar photovoltaic power and RV, specifically aiming to combine the advantages of both sides to set up an energy-intensive solar photovoltaic mobile power system.

BACKGROUND OF THE TECHNOLOGY

At present, various studies have shown that solar photovoltaic energy is the most promising area in a new Energy Era. From a technical point of view, the technology for solar photovoltaic power grid whether Grid Connected PV Systems or Stand-Alone Connected PV Systems has been advanced enough; but from an economical point of view, costs are always a bottleneck of the development. At the same time, leisure travel by driving a RV has gradually become an international fashion trend. RV industry develops rapidly, and the technology is mature. Recently it has become an important development branch of the entire automotive industry. However, the needs to provide sufficient electric power and comfortable living conditions at anytime anywhere have not been satisfied.

DISCLOSURE OF THE INVENTION

The purpose of this invention is to provide an intensive modular system of mobile solar photovoltaic power on the basis of the respective strengths of solar photovoltaic power modules and RV.

The purpose of this invention would be achieved through the following technical solutions:

This intensive solar photovoltaic mobile power module system is fixed in an integrate RV shell which includes a chassis. The chassis has wheels, and the front-end of the chassis connects traction frame. The front-end face of the shell is installed with BIPV solar power glass curtain wall plates. The front and rear parts of the shell are also equipped with solar panels. The middle part of the shell has the central windows. And the rear part of the shell is mounted guardrails and a maintenance ladder. Specially, the front-end face of the shell installed with BIPV solar power glass curtain wall plates has 66-degree angle with the chassis.

The inside layout of the described RV includes a bookshelf, a bathtub, a toilet seat, a refrigerator, sofas, a desk, a vegetables pool, a console, a wardrobe, a door, a platform and a double bed. And the double bed is laid under the BIPV solar power glass curtain wall plates.

SUMMARY OF THE INVENTION

This intensive solar photovoltaic mobile power module system combines the respective advantages of solar photovoltaic power units and RV. It could be used as small portable solar power generation equipment while serving as a habitable facility for the field trip. Furthermore, it could form not only large-scale solar power stations through series or parallel connections but also big RV camp stations. In other words, it is the combination of the following functions: (1) Generating power as an independent solar photovoltaic power unit module; (2) Forming Grid Connected PV power station through modules' portfolio; (3) Mobile feature; and (4) Living function.

DETAILED DESCRIPTION OF THE DRAWINGS

Figure 1:
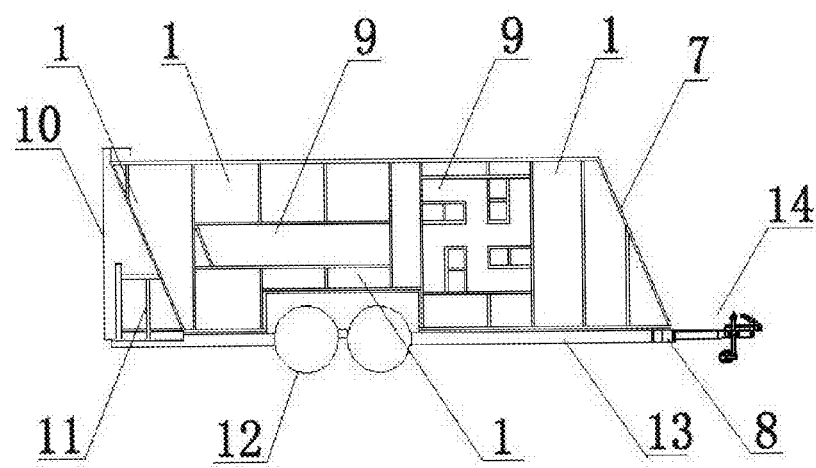
FIG. 1: the structure diagram of the intensive solar photovoltaic mobile power module system.

FIG. 1: 1. Solar panels, 7. BIPV solar power glass curtain wall plates, 8. Cornering light, 9. Windows, 10. Maintenance-ladder, 11. Guard-rails, 12. Wheels, 13. Chassis, and 14. Traction frame.

Figure 2:
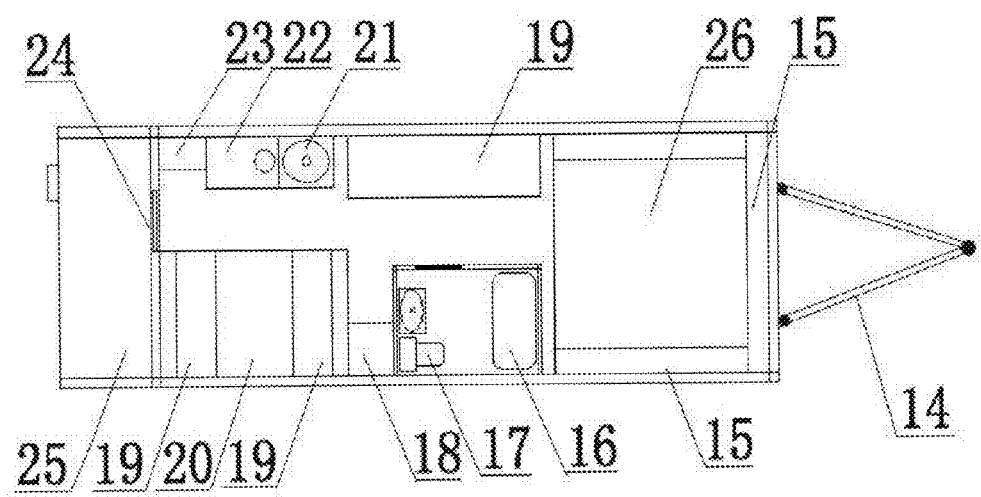
FIG. 2: the inside layout diagram of the RV.

FIG. 2: 14. Traction frame, 15. Bookshelf, 16. Bathtub, 17. Toilet, 18. Fridge, 19. Sofa, 20. Desk, 21. Vegetables pool, 22. Console, 23. Wardrobes, 24. Door, 25. Platform, and 26. Double bed.

Figure 3:
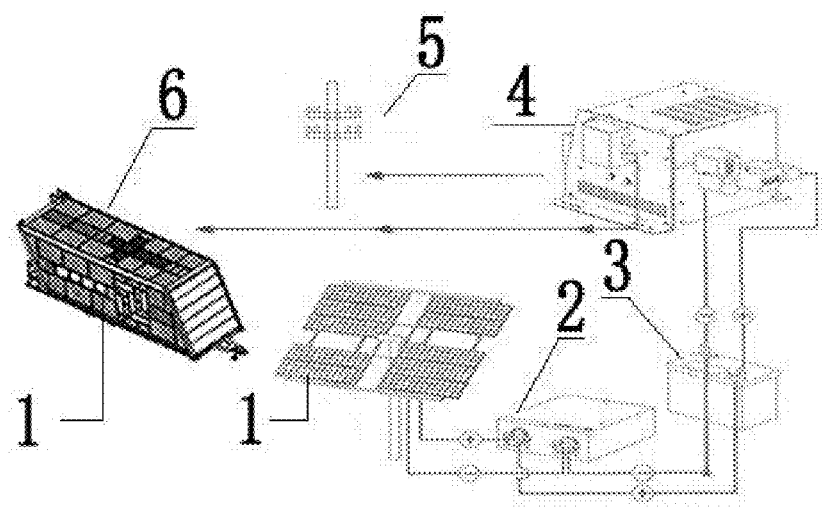
FIG. 3: the schematic diagram of the solar photovoltaic power.

FIG. 3: 1. Solar panels, 2. Controller, 3. Batteries, 4. Inverters, 5. Parallel grid power system, 6. Intensive solar photovoltaic mobile power module system.

Specific Implementation

Referring to FIG. 1, the intensive solar photovoltaic mobile power module system is set in a shell serving as a whole RV, which includes a chassis (13). The chassis (13) has wheels (12); the front-end of the chassis (13) links traction frame (14); and the head part of the chassis (13) is equipped with turn signals (8). The front-end face of the shell is installed with BIPV solar power glass curtain wall plates (7), which has 66-degree angle with the chassis (13); the front and rear body of the shell are fitted with solar panels (1); the middle part of the shell has central windows (9), the rear-end of the shell has guardrails (11) and a maintenance ladder (10). In accordance with the different number of cells in the solar panels (1), the solar panels (1) can be combined into a 48V power generation system by series or parallel mode. The whole front-end face installed with BIPV solar power glass curtain wall plates (7) is designed to has a 66-degree tilt, that is not only conducive to improve the overall appearance but also efficacious to enhance the generation of power. Moreover the shape of central windows can satisfy the needs of beauty and lighting of the RV.

Referring to FIG. 2, the invention as a saloon car, its inside layout includes a bookshelf (15), a bathtub (16), a toilet (17), a refrigerator (18), sofas (19), a desk (20), a vegetables pool (21), a console (22), a closet (23), a door (24), a platform (25) and a double bed (26). This double bed is installed below the BIPV solar power glass curtain wall plates (7). When persons lie on the bed they can see the scenery outside the RV. The people-oriented characteristic of this design effectively raises the RV's comfort.

Referring to FIG. 3, the intensive solar photovoltaic mobile power module system (6) is placed in parallel grid power system (5). It consists of solar panels (1), controller (2), batteries (3) and inverters (4), which are connected in series. When the output port of the inverters (4) is directly connected to RV, through the adjustment of an AC adapter inside the RV, the intensive solar photovoltaic mobile power module system (6) can meet daily energy needs of the RV itself. When the intensive solar photovoltaic mobile power module system (6) generates surplus power, the inverters (4) automatically switch to connect to parallel grid power system (5), then the intensive solar photovoltaic mobile power module system (6) just forms a parallel unit of a traditional parallel grid solar photovoltaic power station, and it can normally output power to parallel grid power system (5).

The design of the invention allows a solar photovoltaic power unit module for parallel grid power plant to have the functions of a RV at the same time. The whole shell of the RV is covered using solar photovoltaic panels, according to different angle of solar radiation and parts of the RV's body, it is divided into four battery component matrixes (Front, right side, top, back). Taking into account the needs of the RV's indoor lighting, the battery plates covered the body of RV is the traditional solar battery plate components, and the BIPV solar power glass curtain wall plate components are installed on the windows, so the light transmission rate can be up to 35%. Another feature of the invention is the front-end face of the shell has 66-degree angle with the chassis that is conducive to the acceptance of solar radiation, therefore the generation of power is improved. Meanwhile the BIPV solar power glass curtain wall plate components are used on the front-end face of the shell, in other words, the front-end face of the shell is a whole glass curtain wall, and so the appearance and lighting function of the RV are effectively improved. Each of battery component matrixes is connected with the input port of the controller, and the DC output port of the controller is connected with a group of batteries. The characteristic of the design is the DC output port of the controller also connects with the DC input port of inverters; meantime the AC output port of the inverters externally connects with local power grid. According to the size of series-parallel units, solar PV power plant with different capacities can be composed. At the same time, when the AC output port of the inverters through the AC adapter connects with the AC load port of the RV, it can provide adequate energy for the RV.

This invention is beneficial in that it solves the cost problem of solar power by providing solutions from others fields. More specifically, by making full combination of energy industry and leisure industry, the investment on leisure facilities could offer complimentary return for investment on energy. Depending on camp size, a small solar photovoltaic power station with 1.5-megawatt capacity could be achieved when 300 RV are parallel connected. (The conclusion is drawn basing on 5 KW modules.)

As a new breakthrough in the field of solar power generation, this invention would greatly contribute to achieve prosperity in this field. The reason is being that it would not only enhance investment returns and living quality but also serve as an integrate part of energy, real estate, automotive, and leisure industries which are so called four engines of world economy. What is more, it would have a far-reaching impact on both global economy crises in the short-term and global warming in the long-term.

The invention claimed is:

1. This intensive solar photovoltaic mobile power module system has the following characteristics:
    There is an integrate RV shell including a chassis (13); within the chassis (13), there are wheels (12); the front-end of the chassis (13) connects traction frame (14); the front-end face of the shell is entirely installed with BIPV solar power glass curtain wall plates (7); the front and rear parts of the shell are equipped with solar panels (1); the middle part of the shell has the central windows (9); and the rear part of the shell is fitted with guard-rails (11) and a maintenance ladder (10).

2. As per claim 1 described, the intensive solar photovoltaic mobile power module system is characterized by: the front-end face of the shell installed with BIPV solar power glass curtain wall plates (7) has 66-degree angle with the chassis (13).

3. As per claim 1 described, the intensive solar photovoltaic mobile power module system is characterized by the inside layout of the described RV which includes a bookshelf (15), a bathtub (16), a toilet seat (17), a refrigerator (18), sofas (19), a desk (20), a vegetables pool (21), a console (22), a wardrobe (23), a door (24), a platform (25) and a double bed (26); and the double bed (26) is installed below the BIPV solar power glass curtain wall plates (7).

* * * * *